United States Patent
Panda (10) Patent No.: US 8,340,172 B2
(45) Date of Patent: Dec. 25, 2012

(54) RATE CONTROL TECHNIQUES FOR VIDEO ENCODING USING PARAMETRIC EQUATIONS

(75) Inventor: Prasanjit Panda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1433 days.

(21) Appl. No.: 11/077,697

(22) Filed: Mar. 10, 2005

(65) Prior Publication Data

US 2006/0114989 A1 Jun. 1, 2006

Related U.S. Application Data (60) Provisional application No. 60/631,835, filed on Nov. 29, 2004.

(51) Int. Cl.
*H04N 7/12* (2006.01)
*H04N 11/02* (2006.01)
*H04N 11/04* (2006.01)

(52) U.S. Cl. ................................. 375/240.03

(58) Field of Classification Search ............... 375/240.03
See application file for complete search history.

(56) References Cited

U.S. PATENT DOCUMENTS 6,633,609 B1 10/2003 Ing et al.
2002/0012395 A1 1/2002 Song et al.

FOREIGN PATENT DOCUMENTS

KR 20030083916 A 11/2003

OTHER PUBLICATIONS

Zhihai He, Anjit K. Mitra; Optimum Bit Allocation and Accurate Rate Control for Video Voding via p-Domain Source Modeling; Oct. 2002; IEEE Transactions on Circuits and Systems for Video Technology; vol. 12 No. 10 pp. 840-849.*
He, Z, et al.; "A Linear Source Model and Unified Rate Control Algorithm for DCT Video Coding"; Nov. 2002; pp. 970-982.
Kwon, et al.; "Adaptive Video Coding Rate Control for Better Perceived Picture Quality in Time-Varying Channels"; IEEE Sep. 2003; pp. 521-525.
Ding, et al.; "Rate Control of MPEG Video Coding and Recording by Rate-Quantization Modeling"; IEEE Feb. 1996; pp. 12-20.
Kamaci, et al.; "ρ-Domain Rate-Distortion Optimal Rate Control for DCT-Based Video Coders"; IEEE May 2004; pp. 149-152.
Shin, et al.; Rate Control Using Linear Rate-ρ Model for H.264.
International Search Report and Written Opinion, PCT/US2005/042530, International Search Authority—European Patent Office, Mar. 22, 2006.
Taiwan Search Report—TW094140720—TIPO—Apr. 3, 2012.

* cited by examiner

*Primary Examiner* — Mehrdad Dastouri
*Assistant Examiner* — Jeremaiah Hallenbeck-Huber
(74) *Attorney, Agent, or Firm* — Kenyon Jenckes; Elaine Lo (57) ABSTRACT

This disclosure describes rate control techniques that can improve video encoding. The described rate control techniques exploit relationships between the number of bits encoded per frame and the number of non-zero coefficients of the video blocks after quantization. The number of number of non-zero coefficients of the video blocks after quantization is referred to as rho ($\rho$). The value of $\rho$ is generally proportional to the number of bits used in the video encoding. This disclosure utilizes a relationship between $\rho$ and a quantization parameter (QP) in order to achieve rate controlled video encoding. More specifically, this disclosure exploits a parametric equation to map a value of a predicted $\rho$ to a QP.

15 Claims, 5 Drawing Sheets

RATE CONTROL TECHNIQUES FOR VIDEO ENCODING USING PARAMETRIC EQUATIONS

The present application claims the benefit of U.S. Provisional Application Patent No. 60/631,835 filed Nov. 29, 2004.

TECHNICAL FIELD

This disclosure relates to digital video processing and, more particularly, rate controlled encoding of video sequences.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. Digital video devices can provide significant improvements over conventional analog video systems in creating, modifying, transmitting, storing, recording and playing full motion video sequences.

A number of different video encoding standards have been established for encoding digital video sequences. The Moving Picture Experts Group (MPEG), for example, has developed a number of standards including MPEG-1, MPEG-2 and MPEG-4. Other standards include the International Telecommunication Union (ITU) H.263 standard, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc. Furthermore, new standards continue to emerge and evolve, including the ITU H.264 standard and a number of proprietary standards.

Many video encoding standards allow for improved transmission rates of video sequences by encoding data in a compressed fashion. Compression can reduce the overall amount of data that needs to be transmitted for effective transmission of video frames. Most video encoding standards, for example, utilize graphics and video compression techniques designed to facilitate video and image transmission over a narrower bandwidth than can be achieved without the compression. The MPEG standards and the ITU H.263 and ITU H.264 standards, for example, support video encoding techniques that utilize similarities between successive video frames, referred to as temporal or inter-frame correlation, to provide inter-frame compression. Such inter-frame compression is typically achieved via motion estimation and motion compensation encoding techniques. In addition, some video encoding techniques may utilize similarities within frames, referred to as spatial or intra-frame correlation, to further compress the video frames.

A number of rate control techniques have been developed for video encoding. Rate control techniques are particularly important in order to facilitate real-time transmission of video sequences, but may also be used in non-real-time encoding settings. For rate control, the encoding techniques dynamically adjust the number of bits that are encoded per frame. In particular, rate control can restrict the number of bits that are encoded per frame in order to ensure that the video sequence can be effectively encoded at a given rate and therefore, transmitted over an allocated bandwidth. If the encoding techniques are not responsive to scene changes of a video sequence, the bit rate for real-time transmission of the video sequence can vary significantly as the scenes change. Therefore, in order to define a substantially constant bit rate, the number of bits per frame are dynamically adjusted during the encoding.

One way to achieve rate controlled encoding is to allow for adjustment of a quantization parameter (QP) used during the video encoding process. The QP defines the quantization that occurs during video encoding, and directly impacts the number of bits that are encoded per second. As the QP increases, less data is preserved and the quality of the video encoding may degrade. As the QP decreases, more data is preserved and the quality of the video encoding improves. However, if the QP is too small, the number of encoded bits per second may exceed an allocated bandwidth, and compromise the ability to transfer the frames within the limited amount of bandwidth. By selecting the QP in a dynamic fashion, the bit rate for transmission of video frames can be made substantially constant. Low variance in the bit rate is very desirable for some video applications.

SUMMARY

This disclosure describes rate control techniques that can improve video encoding. In particular, the described rate control techniques exploit relationships between the number of bits encoded per frame and the number of non-zero coefficients of the video blocks after quantization. The number of non-zero coefficients of the video blocks of the frames after quantization is referred to as rho ($\rho$). The value of $\rho$ is generally proportional to the number of bits used in the video encoding process. This disclosure utilizes a relationship between $\rho$ and a quantization parameter (QP) in order to achieve rate controlled video encoding. More specifically, this disclosure exploits a parametric equation to map a value of a predicted $\rho$ to a QP. The parametric equation may take the form of:

$$\rho = nc \times e^{-f(qp)},$$

where e represents Euler's number (the constant 2.71828182845904523536028747135 . . . ), $\rho$ represents the predicted number of non-zero coefficients of the video blocks of the frames after quantization, nc represents the number of coefficients in the unit under consideration (e.g., the number of coefficients in a frame or video block), and $f(qp)$ is a parametric function of the quantization parameter. By way of example, $f(qp)$ may comprise a simple polynomial or exponential function. In some cases, different constants may be used in place of Euler's number (e), such as a value of 2 or possibly any other constant (k).

During the rate controlled video encoding, the parametric equation may be initialized based on programmable variables that define $f(qp)$. The actual value of $\rho$ (actual $\rho$) can then be calculated for selected values of the QP. The programmable variables that define $f(qp)$ may then be adjusted in order to better approximate the relationship between the predicted $\rho$ and QP. The described techniques may be applied for video block level rate control (e.g., macroblock level), or frame level rate control. In one preferred implementation, video block level rate control is applied, but the variables in the parametric equation are adjusted at the frame level.

In one embodiment, this disclosure provides a video encoding device comprising a memory that stores a video sequence, and an encoder that selects a quantization parameter (QP) for rate controlled video encoding of the video sequence using a parametric equation that maps predicted numbers of non-zero coefficients after quantization (predicted ρ's) to quantization parameters (QP's).

In another embodiment, this disclosure provides a method of rate controlled video encoding comprising selecting a quantization parameter (QP) using a parametric equation that maps predicted numbers of non-zero coefficients after quantization (predicted ρ's) to quantization parameters (QP's), and encoding one or more video blocks using the selected QP.

These and other techniques described herein may be implemented in a digital video device in hardware, software, firmware, or any combination thereof. If implemented in software, the software may be executed in a programmable processor, such as a digital signal processor (DSP). In that case, the software that executes the techniques may be initially stored in a computer readable medium and loaded and executed in the programmable processor for effective rate controlled encoding in a digital video device.

Additional details of various embodiments are set forth in the accompanying drawings and the description below. Other features, objects and advantages will become apparent from the description and drawings, and from the claims.

DETAILED DESCRIPTION

This disclosure describes rate control techniques that can be used to improve video encoding. The techniques may be used with any of a wide variety of video encoding standards, such as the MPEG-4 standard, the ITU H.263 standard, the ITU H.264 standard, or other standards. The techniques exploit relationships between the number of bits encoded per frame (the encoding rate), and the number of non-zero coefficients of the video blocks of the frames after quantization. The number of non-zero coefficients of the video blocks of the frames after quantization is referred to as rho (ρ). The value of ρ is generally proportional to the quantization parameter (QP) used in the video encoding. Accordingly, this disclosure describes a technique that utilizes the relationship between ρ and QP in order to achieve rate controlled video encoding.

More specifically, the technique described in this disclosure exploits a parametric equation to map a predicted value of ρ to a quantization parameter (QP). Since ρ is generally proportional to the encoding rate, a desired ρ can be defined and used to select a desirable QP that should yield the desired encoding rate. The parametric equation may be initialized, but then adjusted during the video encoding so that the predicted ρ defined by the parametric equation better approximates the actual ρ that results from a selected QP. In this manner, the parametric equation is dynamically adjusted during the video encoding so that selected QP's more accurately map to actual ρ's, and therefore, more accurately yield the desired encoding rate.

The parametric equation used to define the predicted ρ may take the form of:

$$\rho = nc \times e^{-f(qp)},$$

where e represents a mathematical constant commonly referred to as Euler's number (2.71828182845904523536028747135 . . . ), ρ represents the predicted number of non-zero coefficients of the video blocks of the frames after quantization, nc represents the number of coefficients in the unit under consideration (e.g., the number of coefficients of a frame or a video block), and $f(qp)$ is a parametric function of the quantization parameter. By way of example, $f(qp)$ may comprise a simple polynomial or exponential function. In some cases, the value of e may be replaced with a different constant, such as a value of 2, or more generally, another constant (k). In any case, useful examples of $f(qp)$ include the following:

$$f(qp) = \alpha \times qp,$$

$$f(qp) = \alpha \times qp + \beta,$$

$$f(qp) = \alpha \times qp^2 + \beta \times qp + \delta,$$

or the exponential function:

$$f(qp) = \alpha \times qp^\beta.$$

In these examples, qp represents the quantization parameter (also referred to herein as QP).

The variables α, β, and δ comprise programmable parameters that can be adjusted during the rate control techniques to better approximate the relationship between ρ and qp in the parametric equation. In particular, during the encoding process, the programmable parameters are adjusted such that the predicted ρ substantially corresponds to the actual ρ for different QP's. A number of examples of parametric equations that may be used by the techniques of this disclosure are described herein, although many other parametric equations may also be useful.

Figure 1:
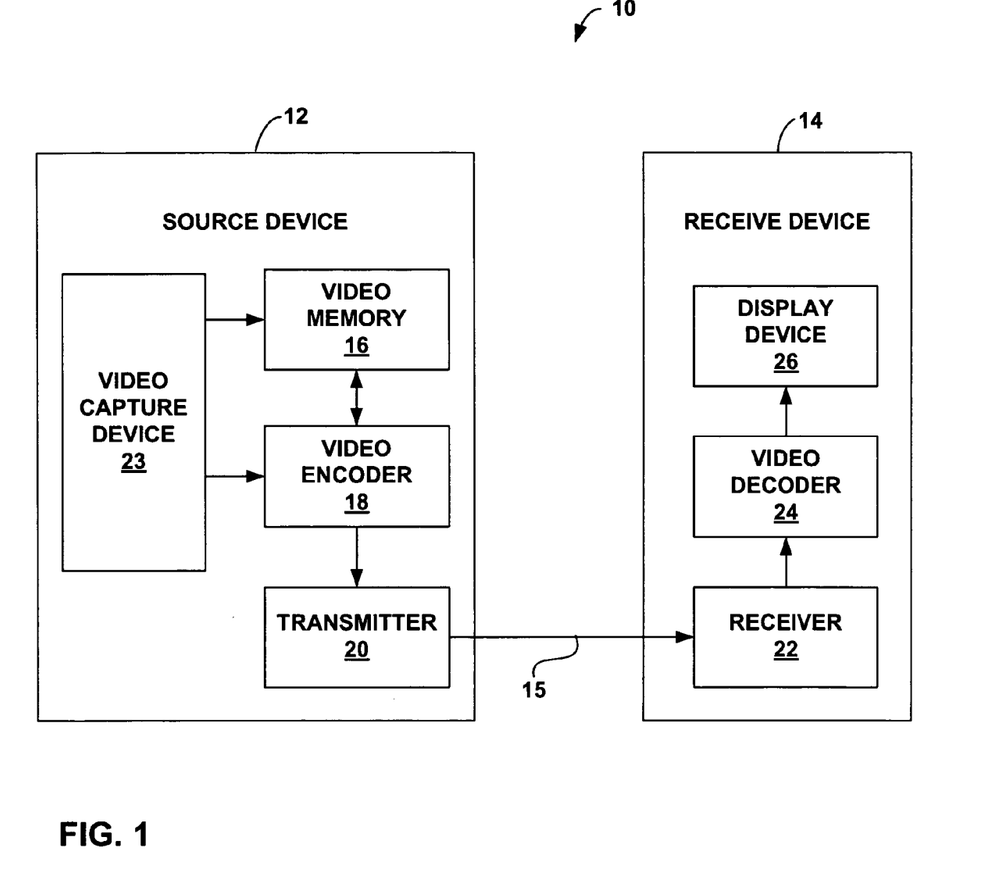
FIG. 1 is a block diagram illustrating an exemplary system in which a source digital video device transmits an encoded sequence of video data to a receive digital video device.

FIG. 1 is a block diagram illustrating an example system 10 in which a source device 12 transmits an encoded sequence of video data to a receive device 14 via a communication link 15. Source device 12 and receive device 14 are both digital video devices. In particular, source device 12 encodes video data consistent with a video standard such as the MPEG-4 standard, the ITU H.263 standard, the ITU H.264 standard, or any of a wide variety of other standards that can make use of rate controlled video encoding. One or both of devices 12, 14 of system 10 implement rate control techniques, as described in greater detail below, in order to improve the video encoding process. Such rate control techniques are particularly useful for real-time transmission of video sequences over a limited bandwidth communication link 15, such as a wireless communication link.

Communication link 15 may comprise a wireless link, a physical transmission line, fiber optics, a packet based network such as a local area network, wide-area network, or global network such as the Internet, a public switched telephone network (PSTN), or any other communication link capable of transferring data. Thus, communication link 15 represents any suitable communication medium, or possibly a collection of different networks and links, for transmitting video data from source device 12 to receive device 14. As mentioned, however, communication link 15 may have limited bandwidth, making rate control very important for real-time transmission of video sequences over link 15. The limited bandwidth may be due to physical constraints on communication link 15, or possibly quality-of-service (QoS) limitations imposed by the provider of communication link 15.

Source device 12 may comprise any digital video device capable of encoding and transmitting video data. Source device 12 may include a video memory 16 to store digital video sequences, a video encoder 18 to encode the sequences, and a transmitter 20 to transmit the encoded sequences over communication link 15 to source device 14. Video encoder 18 may include, for example, various hardware, software or firmware, or one or more digital signal processors (DSP) that execute programmable software modules to control the video encoding techniques, as described herein. Associated memory and logic circuitry may be provided to support the DSP in controlling the video encoding techniques.

Source device 12 may also include a video capture device 23, such as a video camera, to capture video sequences and store the captured sequences in memory 16. In particular, video capture device 23 may include a charge coupled device (CCD), a charge injection device, an array of photodiodes, a complementary metal oxide semiconductor (CMOS) device, or any other photosensitive device capable of capturing video images or digital video sequences.

As further examples, video capture device 23 may comprise a video converter that converts analog video data to digital video data, e.g., from a television, video cassette recorder, camcorder, or another video device. In some embodiments, source device 12 may be configured to transmit real-time video sequences over communication link 15. In that case, receive device 14 may receive the real-time video sequences and display the video sequences to a user. Alternatively, source device 12 may capture and encode video sequences that are sent to receive device 14 as video data files, i.e., not in real-time. Thus, source device 12 and receive device 14 may support applications such as video telecommunication, video clip playback, video mail, or video conferencing, e.g., in a mobile wireless network. Devices 12 and 14 may include various other elements that are not specifically illustrated in FIG. 1.

Receive device 14 may take the form of any digital video device capable of receiving and decoding video data. For example, receive device 14 may include a receiver 22 to receive encoded digital video sequences from transmitter 20, e.g., via intermediate links, routers, other network equipment, and like. Receive device 14 also may include a video decoder 24 for decoding the sequences, and a display device 26 to display the sequences to a user. In some embodiments, however, receive device 14 may not include an integrated display device 14. In such cases, receive device 14 may serve as a receiver that decodes the received video data to drive a discrete display device, e.g., a television or monitor.

Example devices for source device 12 and receive device 14 include servers located on a computer network, workstations or other desktop computing devices, and mobile computing devices such as laptop computers or personal digital assistants (PDAs). Other examples include digital television broadcasting satellites and receiving devices such as digital televisions, digital cameras, digital video cameras or other digital recording devices, digital video telephones such as mobile telephones having video capabilities, direct two-way communication devices with video capabilities, other wireless video devices, and the like.

In some cases, source device 12 and receive device 14 each include an encoder/decoder (CODEC) for encoding and decoding digital video data. In particular, both source device 12 and receive device 14 may include transmitters and receivers as well as memory and displays. Many of the encoding techniques outlined below are described in the context of a digital video device that includes an encoder. It is understood, however, that the encoder may form part of a CODEC. In that case, the CODEC may be implemented within hardware, software, firmware, a DSP, a microprocessor, an application specific integrated circuit (ASIC), a field programmable gate array (FPGA), discrete hardware components, or various combinations thereof.

Video encoder 18 within source device 12 operates on blocks of pixels within a sequence of video frames in order to encode the video data. For example, video encoder 18 may execute motion estimation and motion compensation techniques in which a video frame to be transmitted is divided into blocks of pixels (referred to as video blocks). The video blocks, for purposes of illustration, may comprise any size of blocks, and may vary within a given video sequence. As an example, the ITU H.264 standard supports 16 by 16 video blocks, 16 by 8 video blocks, 8 by 16 video blocks, 8 by 8 video blocks, 8 by 4 video blocks, 4 by 8 video blocks and 4 by 4 video blocks. The use of smaller video blocks in the video encoding can produce better resolution in the encoding, and may be specifically used for locations of video frame that include higher levels of detail. Moreover, video encoder 18 may be designed to operate on 4 by 4 video blocks, and reconstruct larger video blocks from the 4 by 4 video blocks, as needed. For standards such as MPEG-4, the video blocks may comprise 16 by 16 video blocks, sometimes referred to as "macroblocks."

Each pixel in a video block may be represented by various n-bit values, e.g., 8 bits, that define visual characteristics of the pixel such as the color and intensity in values of chromaticity and luminosity. Each pixel may have one or more 8-bit values for both chromaticity and luminosity. The techniques of this disclosure, however, are not limited by the format of the pixels, and may be extended with simpler fewer-bit pixel formats or more complex larger-bit pixel formats. The pixels may also be defined in accordance with other color coordinate systems. Moreover, the video blocks may be represented by discrete cosine transform (DCT) coefficients, following a DCT of the video blocks represented by pixel values. Alternatively, the video blocks may be represented by non-zero wavelet values, following a wavelet transform of the pixel values. In short, the rate control techniques described herein may be applied to a wide variety of encoding standards, pixel formats, and video block sizes and shapes. The selected quantization parameter (QP) defines and limits the number of non-zero coefficients that will be generated in the encoding of a given video frame.

The rate control techniques can be executed during the video encoding process, and can be adapted or adjusted during such encoding. In order to encode a video frame, for each video block in the video frame, video encoder 18 of source device 12 may perform motion estimation by searching video blocks stored in memory 16 for one or more preceding video frames already transmitted (or a subsequent video frames) to identify a similar video block, referred to as a prediction video block. In some cases, the prediction video block may comprise the "best prediction" from the preceding or subsequent video frame, although this disclosure is not limited in that respect. Video encoder 18 performs motion compensation to create a difference block indicative of the differences between the current video block to be encoded and the best prediction. Motion compensation usually refers to the act of fetching the best prediction video block using a motion vector, and then subtracting the best prediction from an input block to generate a difference block. The rate control techniques define the quantization parameter (QP) used to quantize encoded video blocks during the video encoding process. As described herein, this disclosure contemplates the use of a parametric equation to define the QP's used for rate controlled encoding at the video block-level or frame level.

After the motion compensation process has created the difference block, a series of additional encoding steps are typically performed to encode the difference block. These additional encoding steps may depend on the encoding standard being used. In MPEG-4 compliant encoders, for example, the additional encoding steps may include an 8×8 discrete cosine transform, followed by scalar quantization, followed by a raster-to-zigzag reordering, followed by run-length encoding, followed by Huffman encoding. In some cases, however, wavelet transforms, or other transforms of the video blocks may be used instead of DCT transforms. The number of non-zero coefficients after quantization is of paramount concern, as this value impacts the number of bits needed to encode a given block or frame.

Once encoded, the encoded difference block can be transmitted along with a motion vector that identifies the video block from the previous frame (or subsequent frame) that was used for the encoding. In this manner, instead of encoding each frame as an independent picture, video encoder 18 encodes the difference between adjacent frames. Such techniques can significantly reduce the amount of data that needed to accurately represent each frame of a video sequence.

The motion vector may define a pixel location relative to the upper-left-hand corner of the video block being encoded, although other formats for motion vectors could be used. In any case, by encoding video blocks using motion vectors, the required bandwidth for transmission of streams of video data can be significantly reduced.

In some cases, video encoder 18 can support intra frame encoding, in addition to inter frame encoding. Intra-frame encoding utilizes similarities within frames, referred to as spatial or intra-frame correlation, to further compress the video frames. Intra-frame compression is typically based upon texture encoding for compressing still images, such as discrete cosine transform (DCT) encoding. Intra-frame compression is often used in conjunction with inter-frame compression.

Receiver 22 of receive device 14 may receive the encoded video data in the form of motion vectors and encoded difference blocks indicative of encoded differences between the video block being encoded and the best prediction used in motion estimation. In some cases, however, rather than sending motion vectors, the difference between the motion vectors and a previously calculated motion vector predictor (MVP) are transmitted. In any case, decoder 24 can perform video decoding in order to generate video sequences for display to a user via display device 26. The decoder 24 of receive device 14 may also be implemented as an encoder/decoder (CODEC). In that case, both source device 12 and receive device 14 may be capable of encoding, transmitting, receiving and decoding digital video sequences.

In accordance with this disclosure, video encoder 18 selects quantization parameters (QPs) for the video encoding in a dynamic fashion in order to effectuate rate controlled encoding. The QP defines the number of bits that will result as the video blocks are encoded. Thus, the selected QP's directly impact the number of bits that are encoded per second. As the QP increases, less data is preserved and the quality of the video encoding may degrade. As the QP decreases, more data is preserved and the quality of the video encoding improves. However, if the QP is too small, the number of encoded bits per second may exceed an allocated bandwidth, and compromise the ability to transfer the frames within the limited amount of bandwidth. By selecting the QP in a dynamic fashion, the bit rate for transmission of video frames can be made substantially constant.

More specifically, video encoder 18 selects the QP's based on a parametric equation in order to map values of rho ($\rho$) to the quantization parameters (QPs) used in the video encoding. Again, the quantity ($\rho$) represents the number of non-zero coefficients of the video blocks after quantization, and is generally proportional to number of bits used in the video encoding. Accordingly, video encoder 18 utilizes the relationship between $\rho$ and QP in order to achieve rate controlled video encoding. As $\rho$ is approximately linearly related to the bit-rate, the $\rho$-QP parametric equation can be used to select QPs that result in effective rate controlled video encoding.

The parametric equation may be initialized, but then adjusted during the video encoding so that the predicted $\rho$ defined by the parametric equation better approximates the actual $\rho$ that results from a selected QP. Such adjustments to the parametric equation may occur with each video block, or with each frame. In one preferred implementation, video block level rate control is applied, but the variables in the parametric equation are adjusted at the frame level.

Figure 2:
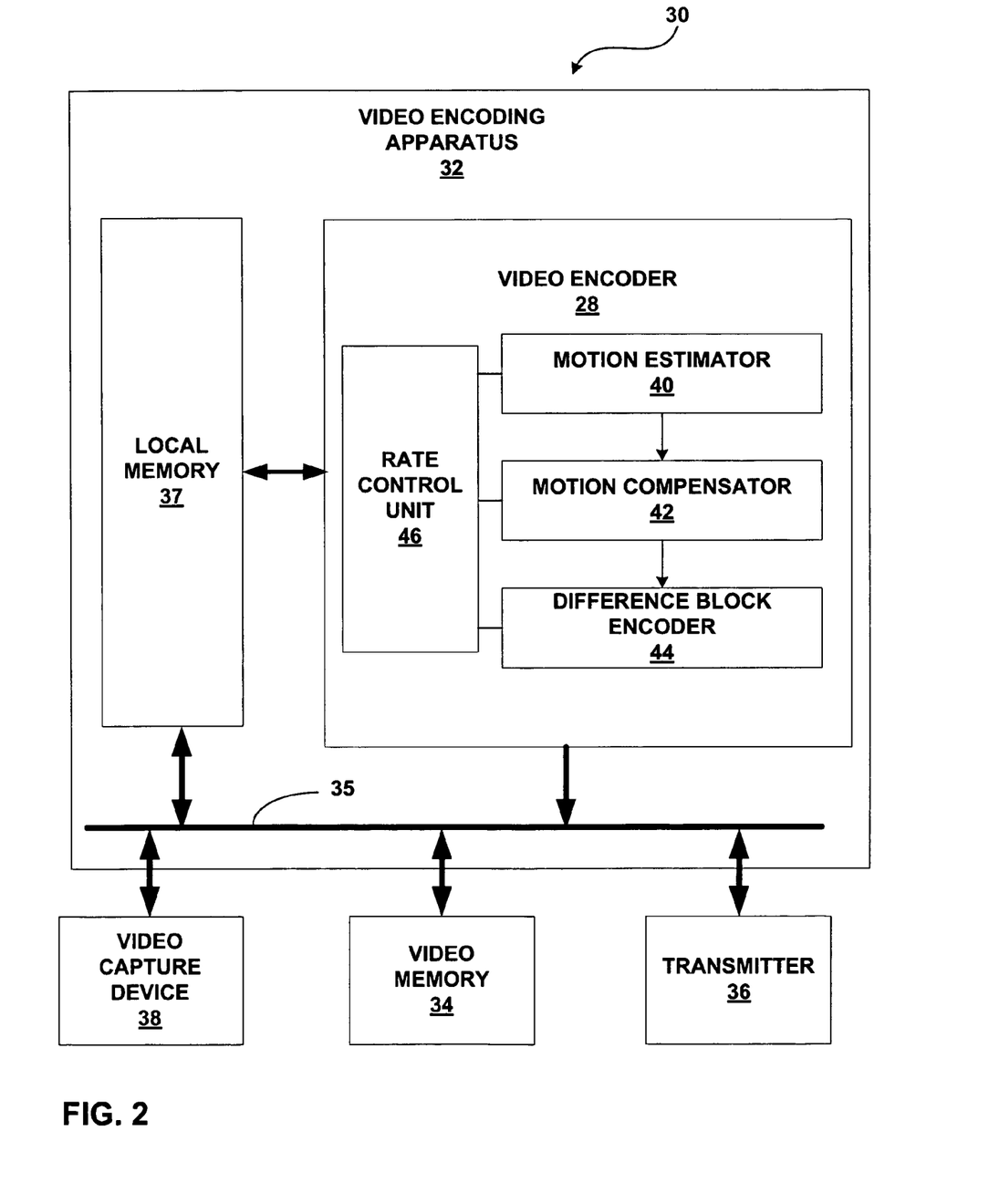
FIG. 2 is an exemplary block diagram of a digital video device according to an embodiment of this disclosure.

FIG. 2 is an exemplary block diagram of a device 30, which may correspond to source device 12. In general, device 30 comprises a digital video device capable of performing the rate controlled encoding techniques as described herein. Device 30 may comply with a video encoding standard such as MPEG-4, ITU H.263, ITU H.264, or another video encoding standard that may benefit from the rate control techniques described herein.

As shown in FIG. 2, device 30 includes a video encoding apparatus 32 to encode video sequences, and a video memory 34 to store the video sequences before and after encoding. Device 30 may also include a transmitter 36 to transmit the encoded sequences to another device, and possibly a video capture device 38, such as a video camera, to capture video sequences and store the captured sequences in memory 34. The various elements of device 30 may be communicatively coupled via a communication bus 35. Various other elements, such as intra-frame encoder elements, various filters, or other elements may also be included in device 30, but are not specifically illustrated for simplicity.

Video memory 34 typically comprises a relatively large memory space. Video memory 34, for example, may comprise dynamic random access memory (DRAM), or FLASH memory. In other examples, video memory 34 may comprise a non-volatile memory or any other data storage device.

Video encoding apparatus 32 may comprise a chip set for a mobile radiotelephone, including a combination of hardware, software, firmware, and/or processors or digital signal processors (DSPs). Video encoding apparatus 32 generally includes a video encoder 28 coupled to a local memory 37. Local memory 37 may comprise a smaller and faster memory space relative to video memory 34. By way of example, local memory 37 may comprise synchronous random access memory (SRAM). Local memory 37 may comprise "on-chip" memory integrated with the other components of video encoding apparatus 32 to provide for very fast access to data during the processor-intensive encoding process. During the encoding of a given video frame, the current video block to be encoded may be loaded from video memory 34 to local memory 37. A search space used in locating the best prediction may also be loaded from video memory 34 to local memory 37. Different memories, however, are not necessary to the execution of the techniques described herein. In other words, video encoder 28 could access an on-chip or off-chip memory to obtain the video blocks and the search space.

The search space may comprise a subset of pixels of one or more of the preceding video frames (or subsequent frames). The chosen subset may be pre-identified as a likely location for identification of a best prediction that closely matches the current video block to be encoded. Moreover, the search space may change over the course of motion estimation, if different search stages are used. In that case, the search space may become progressively smaller in terms of the size of the search space, with these later searches being performed at greater resolution than previous searches.

Local memory 37 is loaded with a current video block to be encoded and a search space, which comprises some or all of one or more video frames used in inter-frame encoding. Motion estimator 40 compares the current video block to various video blocks in the search space in order to identify a best prediction. In some cases, however, an adequate match for the encoding may be identified more quickly, without specifically checking every possible candidate. In that case, the adequate match may not actually be the "best" prediction, albeit adequate for effective video encoding. In general, the phrase "prediction video block" refers to an adequate match, which may be the best prediction.

Motion estimator 40 performs the comparisons between the current video block to be encoded and the candidate video blocks in the search space of memory 37. In some cases, candidate video blocks may include non-integer pixel values generated for fractional interpolation. By way of example, motion estimator 40 may perform sum of absolute difference (SAD) techniques, sum of squared difference (SSD) techniques, or other comparison techniques, in order to define the difference value for the candidate video block. A lower difference value generally indicates that a candidate video block is a better match, and thus a better candidate for use in motion estimation encoding than other candidate video blocks yielding higher difference values.

Ultimately, motion estimator identifies a "best prediction," which is the candidate video block that most closely matches the video block to be encoded. However, it is understood that, in many cases, an adequate match may be located before the best prediction, and in those cases, the adequate match may be used for the encoding. Again, a prediction video block refers to an adequate match, which may be the best prediction.

Once a best prediction is identified by motion estimator 40 for a video block, motion compensator 42 creates a difference block indicative of the differences between the current video block and the best prediction. Difference block encoder 44 may further encode the difference block to compress the difference block, and the encoded difference block can forwarded for transmission to another device, along a motion vector (or the difference between the motion vector and a motion vector predictor) to identify which candidate video block from the search space was used for the encoding. For simplicity, the additional components used to perform encoding after motion compensation are generalized as difference block encoder 44, as the specific components would vary depending on the specific standard being supported. In other words, difference block encoder 44 may perform one or more conventional encoding techniques on the difference block, which is generated as described herein.

During the encoding process, rate control can ensure that number of bits used to encode a given sequence does not exceed bandwidth limitations of a communication channel associated with transmitter 36. In order to perform such rate control, video encoder 28 includes a rate control unit 46. Rate control unit 46 exploits a relationship between the number of bits encoded per frame and the number of non-zero coefficients of the video blocks after quantization. The value of $\rho$, which represents the number of non-zero coefficients of the video blocks after quantization, is generally proportional to the number of bits encoded per frame (and thus the number of bits encoded per second at a constant frame rate). Accordingly, rate control unit 46 utilizes the relationship between $\rho$ and QP in order to achieve rate controlled video encoding.

More specifically, rate control unit 46 applies a parametric equation that maps values of $\rho$ to different QPs. QPs can then be selected for values of $\rho$ corresponding to desirable rates for the video encoding. During the encoding process, the parametric equation can be updated to better reflect the actual relationship between $\rho$ and QP. In other words, the parametric equation may be initialized, but then adjusted during the video encoding so that the predicted $\rho$ defined by the parametric equation better approximates the actual $\rho$ that results from a selected QP. Such adjustments to the parametric equation may occur with each video block, or with each frame. In one preferred implementation, video block level rate control is applied, but the variables in the parametric equation are adjusted at the frame level.

The parametric equation used by rate control unit 46 to define the predicted $\rho$ may take the form of:

$$\rho = nc \times e^{-f(qp)},$$

where e represents a mathematical constant commonly referred to as Euler's number (2.71828182845904523536028747135), $\rho$ represents the predicted number of non-zero coefficients of the video blocks of the frames after quantization, nc represents the number of coefficients in the unit under consideration (e.g., the number of coefficients of a frame or video block), and $f(qp)$ is a parametric function of the quantization parameter. By way of example, $f(qp)$ may comprise a simple polynomial or exponential function. In some cases, the value of e may be replaced with a different constant, such as a value of 2, or the like.

Again, useful examples of $f(qp)$ include the following:

$$f(qp) = \alpha \times qp,$$

$$f(qp) = \alpha \times qp + \beta,$$

$$f(qp) = \alpha \times qp^2 + \beta \times qp + \delta,$$

or the exponential function:

$$f(qp) = \alpha \times qp^\beta.$$

In these examples, qp represents the quantization parameter (also referred to herein as QP). The variables $\alpha$, $\beta$, and $\delta$ comprise programmable parameters that can be adjusted during the rate control techniques to better approximate the relationship between $\rho$ and qp. In particular, during the encoding process, the programmable parameters are adjusted such that the predicted $\rho$ substantially corresponds to the actual $\rho$ for different QP's.

In another example, the parametric equation used by rate control unit 46 may substantially correspond to:

$$\rho = nc \times 2^{-\alpha \times qp - \beta},$$

where $\rho$ defines the predicted $\rho$'s, nc represents a number of coefficients in a unit under consideration and defines a maximum value of the predicted $\rho$'s and $\alpha$ and $\beta$ comprise the adjustable parameters. This parametric equation may be particularly useful for MPEG-4 and H.263 rate control. In this case, the Euler's number (e) in the equation $\rho = nc \times e^{-f(qp)}$ is replaced with the constant 2 in order to make the implementation more efficient without incurring any severe penalty in the precision of the curve.

Also, for MPEG-4 and H.263 rate control, $f(qp)=\alpha \times qp+\beta$ may be used over the other candidates for $f(qp)$, as it represents a compromise between the accuracy of the curve and the complexity of implementing the equation. The accuracy of other members of the parametric equation family, such as the exponential, the second-order polynomial, and the first-order polynomial equations were compared in various simulations. Although the exponential curve has been found to be most accurate, it also has been found to have the highest order of complexity as compared to the other equations. The difference between the first-order parametric equation $f(qp)=\alpha \times qp+\beta$, and a second-order equation in terms of accuracy is negligible. However, while the second-order equation has 3 unknowns and is more complex to implement, the first-order equation has only 2 unknowns and is also less complex.

In some implementations, if a ρ-QP table is already being generated by the video encoder, the ρ-QP table may be exploited by the techniques of this disclosure. For example, if rate control unit 48 needs to solve for two unknowns, α and β, it may sample a ρ-QP table at two points (if such a table is already available). The first point may comprise the QP and the second point may be approximately 2×QP. The exception for this variation of the rate control technique may be cases when QP>25, e.g., for MPEG-4 and H.263, in which case, only one point is sampled and β can be set to zero. Rate control unit 48 may also handle other exceptional cases, such as when the table value at the second sample or the tables values at both samples are zero. The updating of the two unknowns, α and β, may be performed once every frame, although updates may be done more or less often in various implementations.

A ρ-QP table, however, is not required to implement the rate control techniques described herein. If available, e.g., in a legacy encoder that conventionally used a ρ-QP table, the ρ-QP table may still be exploited to accelerate the selection of the adjustable parameters of the parametric equation. However, the adjustable parameters can be easily determined without such a table.

In fact, one major difference between conventional rate control techniques and the parametric rate control techniques described herein is that instead of generating and searching a ρ-QP lookup table (LUT) for the best value of qp, the value of quantization parameter qp can be calculated using a parametric equation such as:

$$qp=(-\log 2(\rho/nc)-\beta)/\alpha,$$

where ρ defines the predicted ρ's, nc represents a number of coefficients in a unit under consideration (e.g., the number of coefficients in a frame) and defines a maximum value of the predicted ρ's and α and β comprise the adjustable parameters. Again, during the encoding process, the programmable parameters are adjusted such that the predicted ρ substantially corresponds to the actual ρ for different QP's. If a ρ-QP table is already available, this may be used to adjust the programmable parameters, but if a ρ-QP table is not available, the programmable parameters may be selected based on particular sample points that define actual ρ's that result from particular QP's.

The intuition behind using the exponential function for $f(qp)$ is based upon the likeness of the ρ-QP curve to one half of a generalized Gaussian distribution, while the intuition behind using the first- and second-order polynomial function corresponds to using a curve similar to a Laplacian- or a Gaussian-distribution, respectively.

Figure 3:
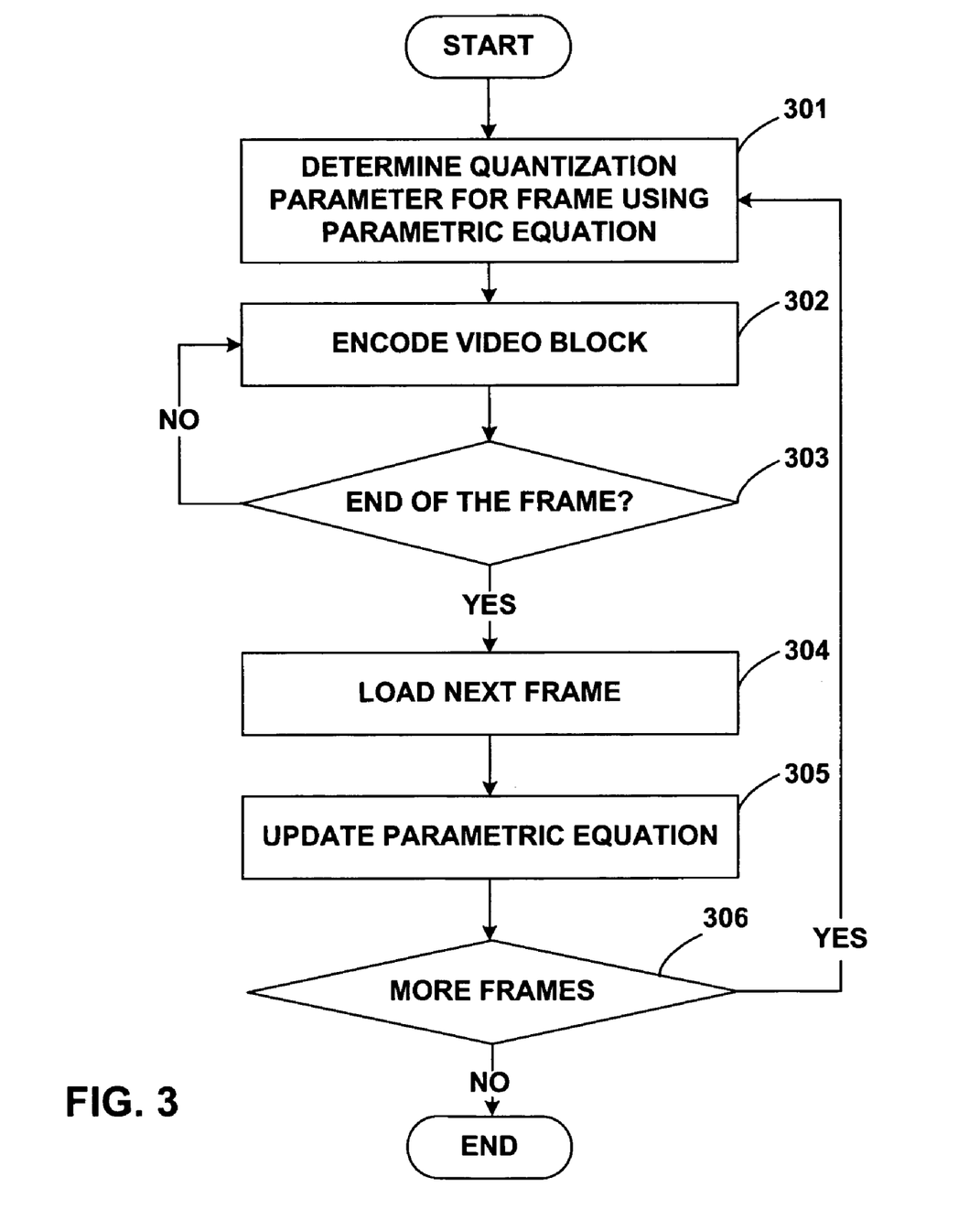
FIG. 3 is a flow diagram illustrating a technique for frame-level rate control using a parametric equation to map predicted values of ρ to quantization parameters (QPs).

FIG. 3 is a flow diagram illustrating a technique for frame-level rate control using a parametric equation to map predicted values of ρ to quantization parameters (QPs). As shown in FIG. 3, rate control unit 46 of video encoder 28 determines a QP for a frame using a parametric equation (301). Initially, the parametric equation may be programmed with initialized values, such that the parametric equation maps predicted values of ρ to QPs. Rate control unit 46 then encodes the video block (302). If the frame includes more video blocks to be encoded (no branch of 303), then rate control unit 46 encodes the other video blocks (302) using the quantization parameter for that frame.

Once the end of the frame is reached (yes branch of 303), the next frame is loaded into local memory 37 for encoding (304). At this point, rate control unit 46 updates the parametric equation (305). In particular, rate control unit 46 may determine the actual values of ρ that resulted from the selected QP for the video block of the previous frame, which may be slightly different than the predicted ρ's that were mapped to the selected QPs by the parametric equation. In this manner, the subsequent frame will be encoded using a more accurate parametric equation.

After updating the parametric equation (305), the process repeats for any subsequent frames (yes branch of 306). In this case, a QP is determined for the next frame using the parametric equation that was updated (301). This process may repeat for all frames of a video sequence to effectuate frame-level rate controlled video encoding of the sequence. Also, if desired, the process could make multiple passes for a given video frame, e.g., when the process begins, in order to more accurately define the parametric equation without actually encoding video blocks using the initialized equation. However, in most cases, the parametric equation will quickly converge after a few frames so that multiple encoding passes per frame are not needed.

Figure 4:
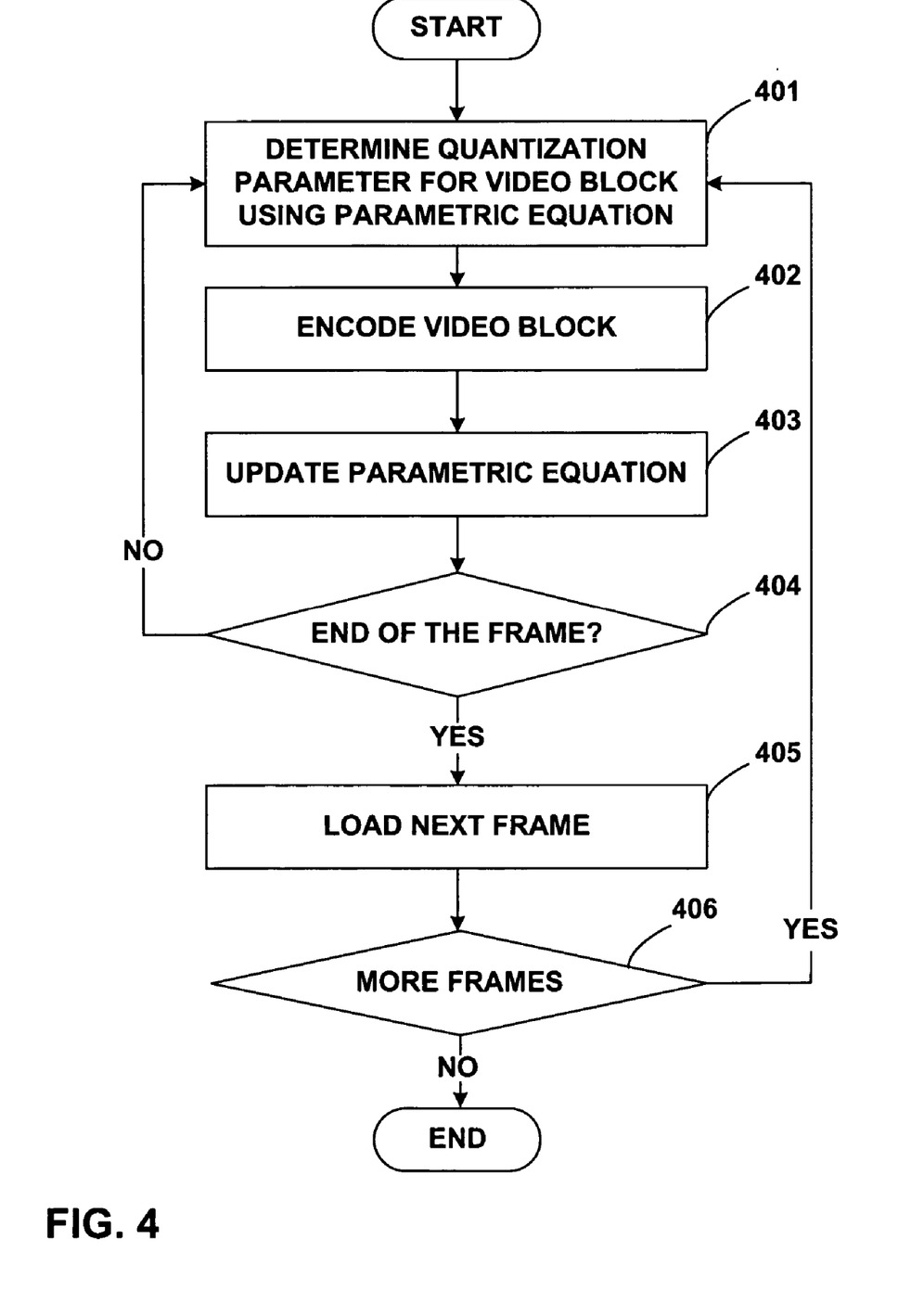
FIG. 4 is a flow diagram illustrating a technique for video block-level rate control using a parametric equation to map predicted values of ρ to quantization parameters (QPs).

FIG. 4 is a flow diagram illustrating a technique for video block-level rate control using a parametric equation to map predicted values of ρ to quantization parameters (QPs). As shown in FIG. 4, rate control unit 46 of video encoder 28 determines a QP for a video block using a parametric equation (401). Initially, the parametric equation may be programmed with initialized values, such that the parametric equation maps predicted values of ρ to QPs. Rate control unit 46 then encodes the video block (402), and updates the parametric equation (403). In particular, rate control unit 46 may determine the actual values of ρ that resulted from the selected QP for one or more previous video blocks of the frame, which may be slightly different than the predicted ρ's that were mapped to the selected QPs by the parametric equation. In this manner, the subsequent video blocks will be encoded using a more accurate parametric equation.

If the frame includes more video blocks to be encoded (no branch of 403), then rate control unit 46 then encode the other video blocks (402) using the quantization parameters determined by the updated parametric equation. This process may repeat for all video blocks of a frame to effectuate video block-level rate controlled video encoding of the sequence. Like the process of FIG. 3, the process of FIG. 4 could be adjusted to make multiple encoding passes, in this case, for a given video block, e.g., when the process begins, in order to more accurately define the parametric equation without actually encoding video blocks using the initialized equation. However, in most cases, the parametric equation will quickly converge after a few video blocks so that multiple passes per video block are not needed.

Once the end of the frame is reached (yes branch of 404), the next frame is loaded into local memory 37 for encoding (405). At this point, rate control unit 46 repeats the process for any subsequent frames (yes branch of 406). For the next frame, a QP is determined using the parametric equation that was most recently updated (401).

Figure 5:
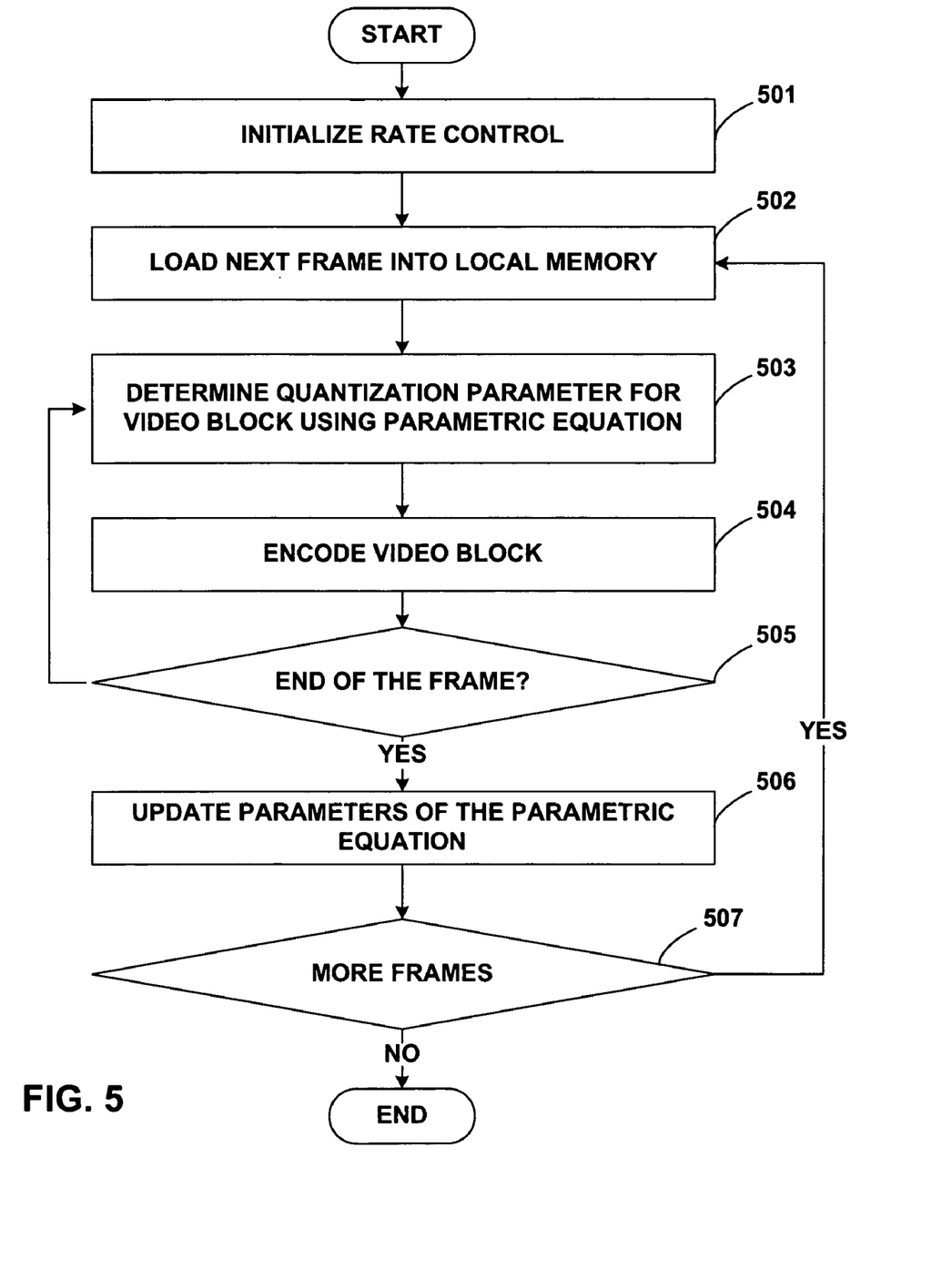
FIG. 5 is a flow diagram illustrating a technique for video block-level rate control using a parametric equation that is adjusted at the frame level.

FIG. 5 is a flow diagram illustrating a technique for video block-level rate control using a parametric equation that is adjusted at the frame level. For purposes of example and illustration, FIG. 5 will be described in the context of a rate control unit 46 programmed with the parametric equation $\rho = nc \times e^{-f(qp)}$, where e represents Euler's number, $\rho$ represents the predicted number of non-zero coefficients of the video blocks of the frames after quantization, nc represents the number of coefficients in a video block, and $f(qp)$ is a parametric function of the quantization parameter given by $f(qp) = \alpha \times qp + \beta$, where qp is the quantization parameter and $\alpha$ and $\beta$ defines the adjustable parameters of the parametric equation. Of course, many other parametric equations could alternatively be used, such as one of the equations defined above or a different parametric equation.

As shown in FIG. 5, rate control is initialized (501). This initialization defines the original values of $\alpha$ and $\beta$ and may be based on average values of $\alpha$ and $\beta$ determined by simulations during manufacture and testing of device 30. To begin the rate controlled encoding process, a frame is loaded from video memory 34 to local memory 37 (502). Rate control unit determines a QP for the encoding of a video block using the parametric equation (503). Rate control unit 46 then encodes the video block using the determined QP (504). If the frame includes more video blocks to be encoded (no branch of 505), then rate control unit 46 determines respective QP's for each of the video blocks using the parametric equation (503) and encodes the video blocks using the respective QP's. In this sense, the QP's are determined at a video block level, but the parametric equation that defines the QP's does not change for a given frame.

Once the end of the frame is reached (yes branch of 505), rate control unit updates the adjustable parameters ($\alpha$ and $\beta$) of the parametric equation (506). In particular, rate control unit 46 may determine the actual values of $\rho$ that resulted from the selected QP for the video block of the previous frame, which may be slightly different than the predicted $\rho$'s that were mapped to the selected QPs by the parametric equation. Rate control unit 46 may select new values of $\alpha$ and $\beta$ such that the actual values of $\rho$ are more correctly mapped to values of QP by the parametric equation. In this manner, the subsequent frame will be encoded using a more accurate parametric equation that better reflects the actual relationship between $\rho$ and QP.

After updating the parameters of the parametric equation (506), the process repeats for any subsequent frames of the video sequence (yes branch of 507). In this case, the next frame is loaded into local memory 37 (502), and rate control unit 46 determines respective QP's for each of the video blocks using the parametric equation (503) and encodes the video blocks using the respective QP's (504).

This process may repeat for all frames of a video sequence to effectuate video block-level rate controlled video encoding of the sequence, with parametric equation adjustments for each frame. Also, the process could make multiple passes for a given video frame, e.g., when the process begins, in order to better define the parametric equation for the first few frames of the sequence without actually encoding the video blocks using the initialized equation. This may improve accuracy of the rate control, at the expense of additional computations. In most cases, however, the parametric equation will quickly converge to an accurate representation of the $\rho$-QP relationship after few number of frames have been encoded. Therefore, the need for multiple passes per frame can typically be avoided.

Various embodiments have been described. In particular, various rate control techniques have been proposed that use a parametric equation to represent the mapping between the quantization parameter QP and the number of non-zero coefficients $\rho$. A non-exhaustive list of some useful parametric equations have been identified that are able to accurately represent this relationship. The techniques may operate to limit the number of quantized DCT coefficients that define encoded video blocks, although other types of coefficients, such as wavelet transformed coefficients might alternatively be used. In addition, the techniques described herein may be applied only with respect to P-Frames (Predicted Frames), or possible applied with respect to both I-Frames (Intra-Frames) and P-Frames. For example, many encoding standards, such as H.263, MPEG-4 and H.264, make use of such I-Frames and P-Frames. In such cases, the techniques described herein may be applied only with respect to P-Frames, or possibly with respect to both I-Frames and P-Frames.

The parametric rate control described herein has the flexibility to provide frame-level rate control, or video block-level rate control. In a preferred embodiment, video block level rate control is used with frame-level updates to the parametric equation. Moreover, the video block-level rate control techniques may be configurable in the sense that two QP offsets (or more) can be set, which in turn determines the amount of variance that can be tolerated. Typically, higher values for the offsets guarantee lower levels of variance, at the cost of lower video quality. Simulations have shown that with the rate control techniques described herein, variance can be significantly reduced while maintaining almost the same level of video quality. Furthermore, using a parametric equation to calculate the qp for each video block may be more accurate and computationally efficient than generating and/or searching a $\rho$-QP table.

The techniques described herein may be implemented in hardware, software, firmware, or any combination thereof. If implemented in software, the techniques may be directed to a computer readable medium comprising program code, that when executed in a device that encodes video sequences, performs one or more of the methods mentioned above. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components to accelerate the encoding process. In other cases, the video encoder may be implemented as a microprocessor, one or more application specific integrated circuits (ASICs), one or more field programmable gate arrays (FPGAs), or some other hardware-software combination. These and other embodiments are within the scope of the following claims.

The invention claimed is:

1. A video encoding device comprising: a memory that stores a video sequence; and an encoder configured to:

select, for one or more video blocks of a first frame, a quantization parameter (QP) using a dynamically adjustable parametric equation that directly maps predicted numbers of non-zero coefficients after quantization (predicted $\rho$'s) to quantization parameters (QP's) to directly determine the QP's from the predicted $\rho$'s without using a lookup table, wherein the dynamically adjustable parametric equation includes one or more adjustable parameters within a function of the quantization parameter;

encode the one or more video blocks of the first frame using the one or more selected QP's;

determine one or more actual numbers of non-zero coefficients after quantization (actual ρ's) for the one or more video blocks of the first frame that result from one or more selected QP's;

determine a new value for at least one of the one or more adjustable parameters such that the dynamically adjustable parametric equation with the new value maps the predicted ρ's to new QP's, and wherein the new QP's result in actual ρ's that better correspond to the predicted ρ's compared to the actual p's that resulted from the one or more selected QP's;

select, for one or more video blocks of a second frame, a new quantization parameter using the dynamically adjustable parametric equation and the new value for at least one of the one or more adjustable parameters; and encode the one or more video blocks of the second frame using the new quantization parameter;

wherein the parametric equation substantially corresponds to:

$$\rho = nc \times e^{-f(qp)},$$

where e represents Euler's number, ρ defines the predicted ρ's, nc represents a number of coefficients in a unit under consideration and defines a maximum value of the predicted ρ's and $f(qp)$ is a parametric function of the quantization parameter (QP).

2. The video encoding device of claim 1, wherein the encoder selects respective QPs for different respective frames of the video sequence and performs frame-level rate controlled video encoding of the video sequence using the respective QPs for the different respective frames.

3. The video encoding device of claim 1, wherein the encoder selects respective QPs for different respective video blocks of video frames of the video sequence and performs video block-level rate controlled video encoding of the video sequence using the respective QPs for the different respective video blocks.

4. The video encoding device of claim 1, wherein $f(qp)$ comprises one of a polynomial function and an exponential function.

5. The video encoding device of claim 1, wherein $f(qp)$ comprises a first order polynomial function substantially corresponding to:

$$f(qp) = \alpha \times qp,$$

where qp corresponds to the quantization parameter (QP) and α defines a first order adjustable parameter.

6. A method of rate controlled video encoding comprising:
selecting for one or more video blocks of a first frame, by an encoder, a quantization parameter (QP) using a dynamically adjustable parametric equation that directly maps predicted numbers of non-zero coefficients after quantization (predicted p's) to quantization parameters (QP's) to directly determine the QP's from the predicted ρ's without using a lookup table, wherein the dynamically adjustable parametric equation includes one or more adjustable parameters within a function of the quantization parameter;
encoding, by the encoder, the one or more video blocks of the first frame using the one or more selected QP;

determining, by the encoder, one or more actual numbers of non-zero coefficients after quantization (actual ρ's) for the one or more video blocks of the first frame that result from one or more selected QP's;

determining, by the encoder, a new value for at least one of the one or more adjustable parameters such that the dynamically adjustable parametric equation with the new value maps the predicted ρ's to new QP's, and wherein the new QP's result in actual p's that better correspond to the predicted ρ's compared to the actual ρ's that resulted from the one or more selected QP's;

selecting for one or more video blocks of a second frame, by the encoder, a new quantization parameter using the dynamically adjustable parametric equation and the new value for at least one of the one or more adjustable parameters; and encoding, by the encoder, the one or more video blocks of the second frame using the new quantization parameter;

wherein the parametric equation substantially corresponds to:

$$\rho = nc \times e^{-f(qp)},$$

where e represents Euler's number, ρ defines the predicted ρ's, represents a number of coefficients in a unit under consideration and defines a maximum value of the predicted ρ's and $f(qp)$ is a parametric function of the quantization parameter (QP).

7. The method of claim 6, further comprising selecting different QPs to be used for different video frames of a video sequence for frame-level rate controlled video encoding of the video sequence.

8. The method of claim 6, further comprising selecting different QPs to be used for different video blocks of video frames for video block-level rate controlled video encoding of a video sequence.

9. The method of claim 6, wherein $f(qp)$ comprises one of a polynomial function and an exponential function.

10. The method of claim 6, wherein $f(qp)$ comprises a first order polynomial function substantially corresponding to:

$$f(qp) = \alpha \times qp,$$

where qp corresponds to the quantization parameter (QP) and α defines a first order adjustable parameter.

11. A non-transitory, computer readable medium comprising program code that when executed cause a programmable processor to:

select, for one or more video blocks of a first frame, a quantization parameter (QP) using a dynamically adjustable parametric equation that directly maps predicted numbers of non-zero coefficients after quantization (predicted p's) to quantization parameters (QP's) to directly determine the QP's from the predicted p's without using a lookup table, wherein the dynamically adjustable parametric equation includes one or more adjustable parameters within a function of the quantization parameter; encode the one or more video blocks of the first frame using the selected QP;

determine one or more actual numbers of non-zero coefficients after quantization (actual ρ's) for the one or more video blocks of the first frame that result from one or more selected QP's;

determine a new value for at least one of the one or more adjustable parameters such that the dynamically adjustable parametric equation with the new value maps the predicted ρ's to new QP's, and wherein the new QP's result in actual p's that better correspond to the predicted ρ's compared to the actual p's that resulted from the one or more selected QP's;

select for one or more video blocks of a second frame a new quantization parameter using the dynamically adjustable parametric equation and the new value for at least one of the one or more adjustable parameters; and encode the one or more video blocks of the second frame using the new quantization parameter;

wherein the parametric equation substantially corresponds to:

$$\rho = nc \times e^{-f(qp)},$$

where e represents Euler's number, ρ defines the predicted ρ's, represents a number of coefficients in a unit under consideration and defines a maximum value of the predicted ρ's and $f(qp)$ is a parametric function of the quantization parameter (QP).

12. The non-transitory, computer readable medium of claim 11, the medium further including instructions that cause the programmable processor to select different QPs to be used for different video frames of a video sequence for frame-level rate controlled video encoding of the video sequence.

13. The non-transitory, computer readable medium of claim 11, the medium further including instructions that cause the programmable processor to select different QPs to be used for different video blocks of video frames for video block-level rate controlled video encoding of a video sequence.

14. The non-transitory, computer readable medium of claim 11, wherein $f(qp)$ comprises one of a polynomial function and an exponential function.

15. The non-transitory, computer readable medium of claim 11, wherein $f(qp)$ comprises a first order polynomial function substantially corresponding to:

$$f(qp) = \alpha \times qp,$$

wherein qp corresponds to the quantization parameter (QP) and α defines a first order adjustable parameter.

* * * * *